(12) United States Patent
Dellach

(10) Patent No.: US 11,624,476 B2
(45) Date of Patent: Apr. 11, 2023

(54) ENCLOSED PIVOT UNIT

(71) Applicant: TECH RIM STANDARDS, LLC, Rochester Hills, MI (US)

(72) Inventor: Kenneth Dellach, Shelby Township, MI (US)

(73) Assignee: Tech Rim Standards, LLC, Rochester Hills, MI (US)

(*) Notice: Subject to any disclaimer, the term of this patent is extended or adjusted under 35 U.S.C. 154(b) by 126 days.

(21) Appl. No.: 16/844,780

(22) Filed: Apr. 9, 2020

(65) Prior Publication Data

US 2020/0326036 A1  Oct. 15, 2020

Related U.S. Application Data

(60) Provisional application No. 62/831,241, filed on Apr. 9, 2019.

(51) Int. Cl.
| | |
|---|---|
| *F16H 21/06* | (2006.01) |
| *F16M 13/02* | (2006.01) |
| *F16F 1/02* | (2006.01) |
| *F16H 21/44* | (2006.01) |

(52) U.S. Cl.
CPC .......... *F16M 13/022* (2013.01); *F16F 1/02* (2013.01); *F16H 21/06* (2013.01); *F16H 21/44* (2013.01)

(58) Field of Classification Search
CPC ............ F16C 11/10; F16M 2200/024; B25J 17/0258; B25J 17/0241; B25J 19/063; B25J 17/0208; B25J 17/0216; B25J 17/0225; B25J 17/0233
See application file for complete search history.

(56) References Cited

U.S. PATENT DOCUMENTS

| | | | | |
|---|---|---|---|---|
| 5,216,930 A | * | 6/1993 | McNamara | B23K 37/0435 212/261 |
| 5,634,629 A | * | 6/1997 | Blatt | B25B 5/122 269/229 |
| 5,875,678 A | * | 3/1999 | McNamara | B25J 19/0091 74/105 |

(Continued)

OTHER PUBLICATIONS

Tunkers Product Overview, 9 Modules for Automation: https://www.tuenkers-modular-automation.com/product-overview/mn_45506; at least as early as Feb. 5, 2019.

(Continued)

*Primary Examiner* — William C Joyce
*Assistant Examiner* — Gregory Robert Weber
(74) *Attorney, Agent, or Firm* — Brooks Group, PLC

(57) ABSTRACT

A pivot unit comprising a linear actuator; a rod assembly driven by the linear actuator; an output shaft driven by the rod assembly; a housing enclosing the rod assembly and a portion of the output shaft, and attached to the linear actuator; a saddle driven by the output shaft; a first stop arm operatively attached to the first arm and a first end of the output shaft; a second stop arm operatively attached to the second arm and a second end of the output shaft; a first shock absorber secured to a first side of the housing and constructed and arranged to accept a first end of the first stop arm; and a second shock absorber secured to a second side of the housing and constructed and arranged to accept a first end of the second stop arm.

4 Claims, 4 Drawing Sheets

(56) References Cited

U.S. PATENT DOCUMENTS

| | | | | |
|---|---|---|---|---|
| 6,354,580 B1* | 3/2002 | Nagai | .................... | B25B 5/12 |
| | | | | 269/225 |
| 6,488,273 B2 | 12/2002 | Sawdon et al. | | |
| 9,422,971 B2* | 8/2016 | Tran | .................... | F16M 11/18 |
| 10,800,008 B2* | 10/2020 | Fukui | .................... | B25B 5/122 |
| 11,007,613 B2* | 5/2021 | Migliori | .................... | B25B 5/163 |
| 2002/0153650 A1* | 10/2002 | Sawdon | .................... | B23Q 5/26 |
| | | | | 269/20 |
| 2004/0041324 A1* | 3/2004 | Fukui | .................... | B25B 5/16 |
| | | | | 269/32 |
| 2006/0285915 A1* | 12/2006 | Dellach | .................... | F16C 11/10 |
| | | | | 403/92 |
| 2014/0035212 A1* | 2/2014 | Dellach | .................... | B25B 5/122 |
| | | | | 269/32 |
| 2015/0190924 A1* | 7/2015 | Clees | .................... | B30B 1/00 |
| | | | | 74/490.01 |
| 2018/0194001 A1* | 7/2018 | Clees | .................... | B25B 5/064 |

OTHER PUBLICATIONS

Destaco Pneumatic & Electric Pivot Units webpage: https://www.destaco.com/pivot-units.html; at least as early as Feb. 5, 2019.
Univer Industrial Automation website: http://www.univer-group.com/en/power-pivots/; at least as eariy as Feb. 5, 2019.

* cited by examiner

ENCLOSED PIVOT UNIT

CROSS-REFERENCE TO RELATED APPLICATIONS

This application claims the benefit of U.S. Provisional Application No. 62/831,241, filed Apr. 9, 2019.

TECHNICAL FIELD

The field to which the disclosure generally relates to includes pivot power work devices, components thereof, and methods of making and using the same.

BACKGROUND

Pivot power work devices may be used to moveably position tools and/or other work devices.

SUMMARY OF ILLUSTRATIVE VARIATIONS

A number of variations may include a pivot unit comprising: a linear actuator; a rod assembly operatively attached to and driven by the linear actuator; an output shaft operatively attached to and driven by the rod assembly; a housing enclosing the rod assembly and a portion of the output shaft, wherein the housing is attached to the linear actuator; a saddle having a base, a first arm extending from the base, and a second arm extending from the base and spaced from the first arm, wherein the first arm and the second arm are operatively attached to opposing ends of the output shaft and driven by the output shaft; a first stop arm operatively attached to the first arm and a first end of the opposing ends of the output shaft; a second stop arm operatively attached to the second arm and a second end of the opposing ends of the output shaft; a first shock absorber secured to a first side of the housing and constructed and arranged to accept a first end of the first stop arm; and a second shock absorber secured to a second side of the housing and constructed and arranged to accept a first end of the second stop arm.

A number of variations may include a pivot unit comprising: a linear actuator; a rod operatively attached to and driven by the linear actuator; a first link having a first end and a second end, wherein the first end of the first link is operatively attached to a first end of the rod; a second link having a first end and a second end, wherein the first end of the second link is operatively attached to the second end of the first link; an output shaft operatively attached to the second end of the second link; a housing surrounding at least a portion of the rod, the first link, the second link, and the output shaft; a saddle having a base, a first arm having a plurality of cutouts, and a second arm, having a plurality of cutouts, spaced from the first arm, wherein the first arm and the second arm are operatively attached to the output shaft and are constructed and arranged to be driven by the output shaft; a first stop arm having a plurality of teeth operatively attached to the first plurality of cutouts in the first arm of the saddle and a first end of the output shaft; a second stop arm having a plurality of teeth operatively attached to the second plurality of cutouts in the second arm of the saddle and a second end of the output shaft; a first shock absorber secured to a first side of the housing; and a second shock absorber secured to a second side of the housing.

A number of variations may include a product comprising: a stop arm comprising an elongated body having a first face, a second face, and a third face extending therebetween; a stop secured to a first end of the elongated body; wherein a second end of the elongated body is rounded and includes a first plurality of serrated teeth on the first face arranged in a circular pattern and a second plurality of serrated teeth on the second face arranged in the circular pattern, wherein at least one of the first plurality of serrated teeth or the second plurality of serrated teeth are constructed and arranged to be secured to a saddle arm of a pivot unit; and wherein the second end further includes an opening defined by an inner surface of the elongated body constructed and arranged to receive a mechanical fastener.

A number of variations may include a product comprising: a shock absorber mount comprising: a housing constructed and arranged to receive at least a portion of a shaft and a spring, wherein the housing further comprises a mounting plate, wherein the mounting plate includes a protrusion having a triangular shape constructed and arranged to mate with a triangular shaped cutout on a mating component, and to distribute load on a shock absorber, and wherein the mounting plate further includes at least one opening constructed and arranged to accommodate a mechanical fastener.

A number of variations may include a product comprising: a shock absorber comprising: a shaft; a spring operatively attached to the shaft, wherein the spring is in an extended position; a head operatively attached to the spring; a housing constructed and arranged to receive at least a portion of the shaft and spring, wherein the housing further comprises a mounting plate, wherein the mounting plate includes a protrusion having a triangular shape constructed and arranged to mate with a triangular shaped opening on a mating component for positioning the shock absorber on the mating component and to distribute load on the shock absorber.

A number of variations may include a method comprising: providing a pivot unit comprising: a linear actuator; a rod assembly driven by the linear actuator; an output shaft driven by the rod assembly; a housing enclosing the rod assembly and a portion of the output shaft; a saddle comprising a first arm, having a first plurality of cutouts, extending from the base and a second arm, having a second plurality of cutouts, extending from the base, wherein the first arm and the second arm are driven by the output shaft to rotate the saddle; a first stop arm having a first plurality of teeth operatively attached to the first arm of the saddle in a first position and attached to the output shaft via a first mechanical fastener; a second stop arm having a second plurality of teeth operatively attached to the second arm in a first position and attached to the output shaft via a second mechanical fastener; a first shock absorber positioned to accept the first stop arm to absorb shock from the first stop arm; and a second shock absorber constructed and arranged to accept the second stop arm to absorb shock from the second stop arm; removing the first mechanical fastener from the output shaft and removing the first stop arm from the first position in the first arm of the saddle; placing the first plurality of teeth in the first stop arm into the first plurality of cutouts in the first arm of the saddle at a second position; securing the first stop arm to the output shaft via the first mechanical fastener; removing the second mechanical fastener from the output shaft and removing the second stop arm from the first position in the second arm of the saddle; placing the second plurality of teeth in the second stop arm into the second plurality of cutouts in the second arm of the saddle at a second position; and securing the second stop arm to the output shaft via the second mechanical fastener.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
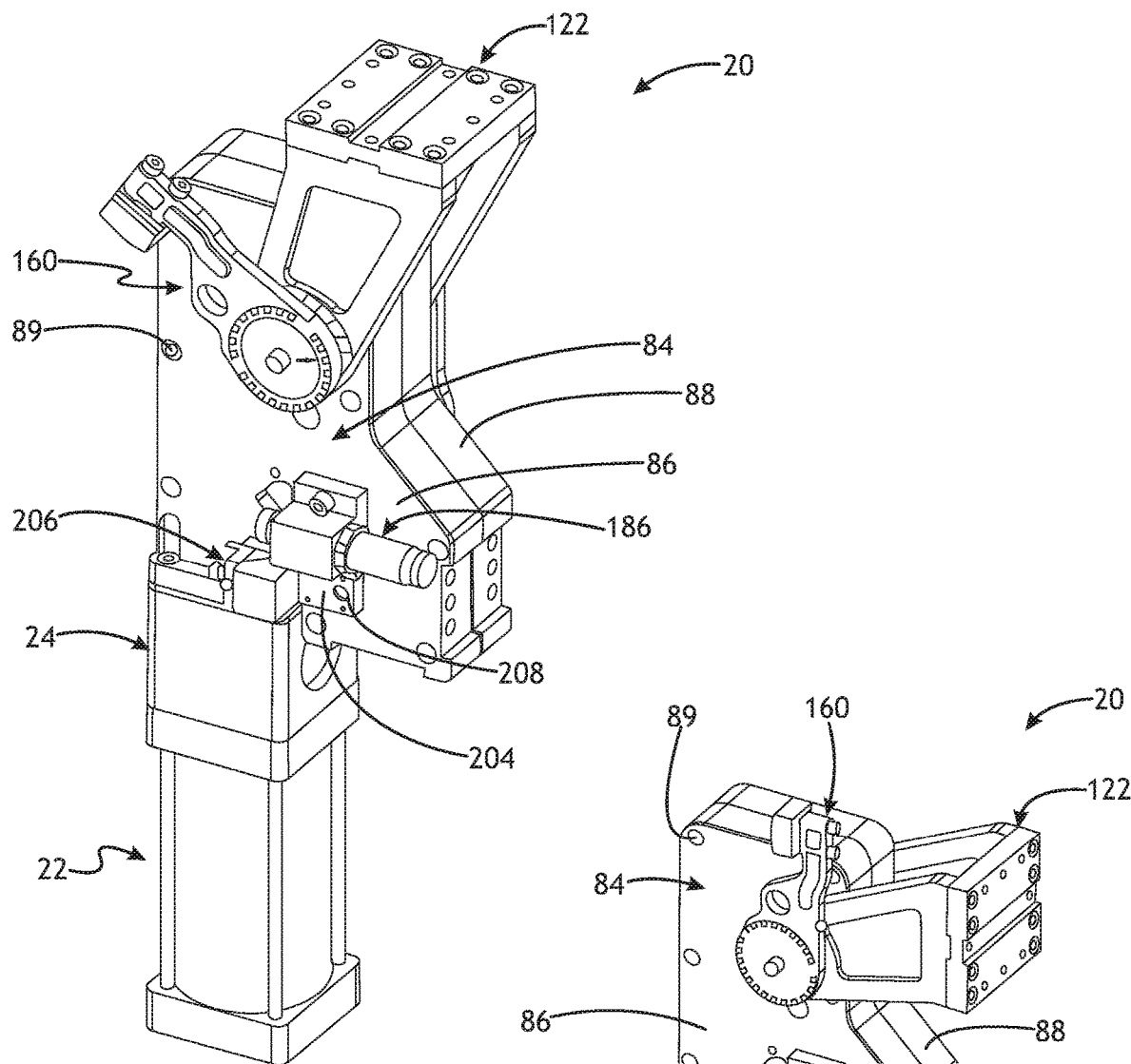
FIG. 1 illustrates a perspective view of a pivot unit having a saddle in a first position according to a number of variations.
Figure 2:
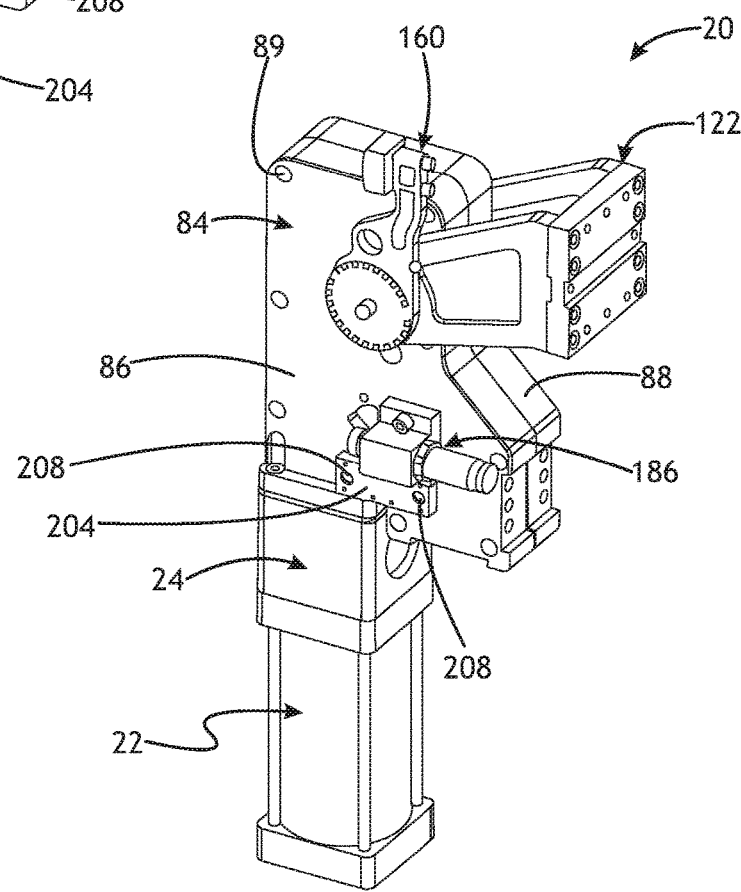
FIG. 2 illustrates a perspective view of a pivot unit having a saddle in a second position according to a number of variations.
Figure 3:
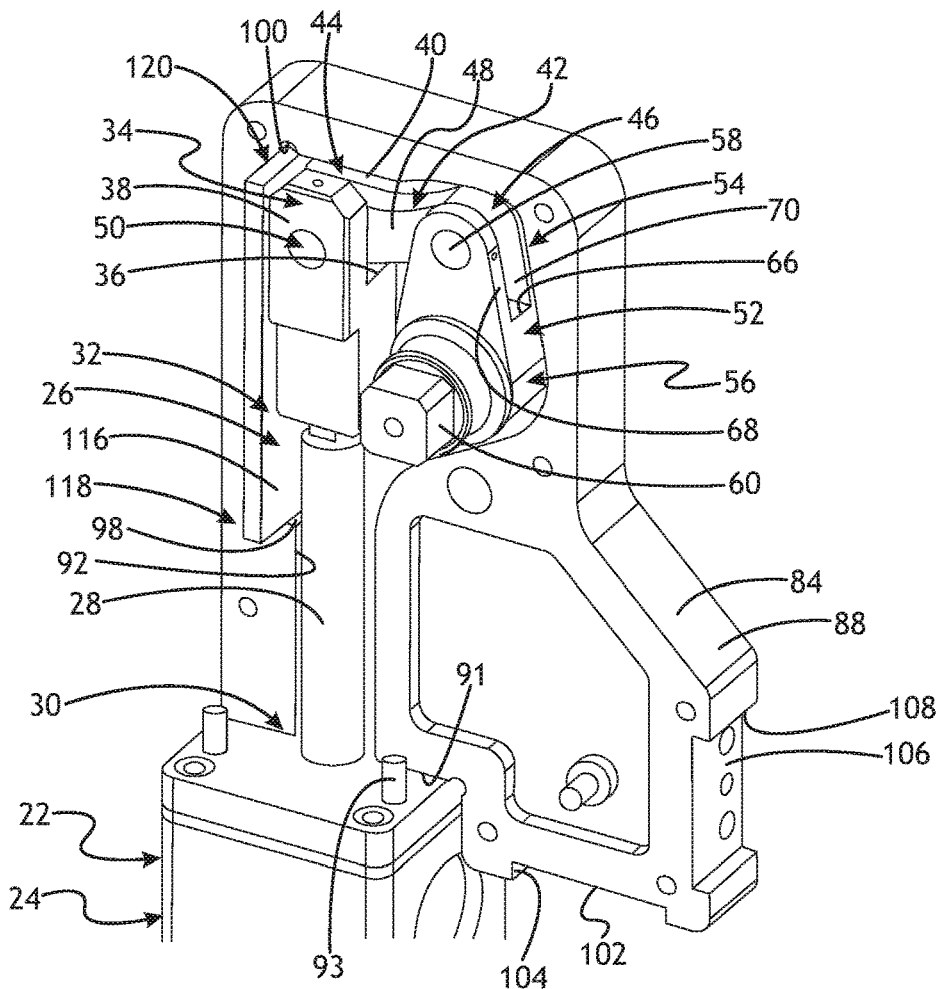
FIG. 3 illustrates a perspective view of a rod assembly of a pivot unit according to a number of variations.
Figure 9:
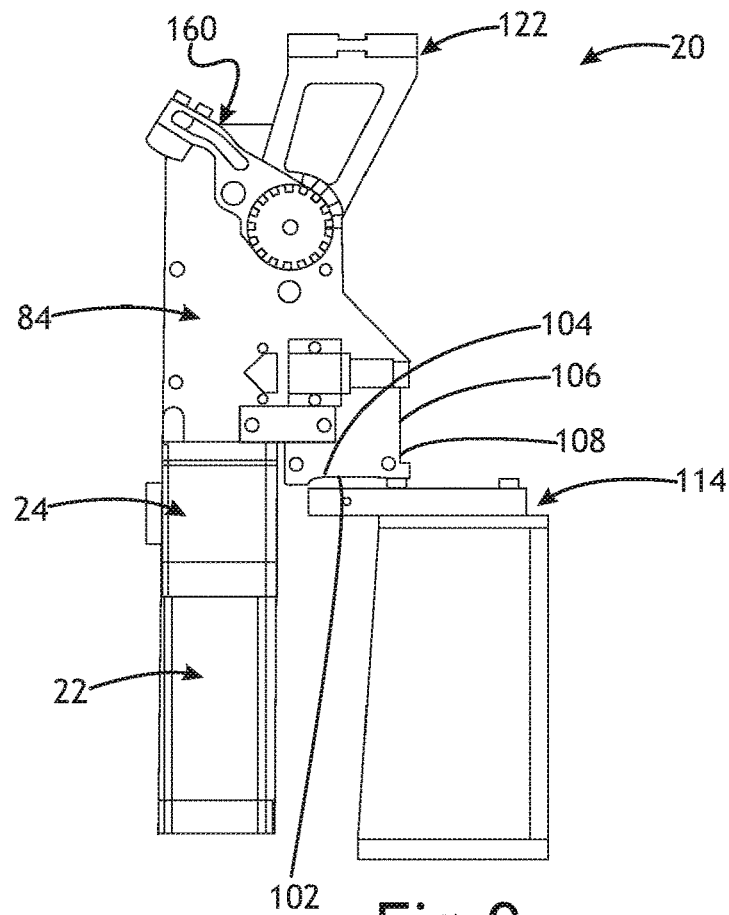
FIG. 9 illustrates a side view of a pivot unit mounted in a vertical position according to a number of variations.
Figure 10:
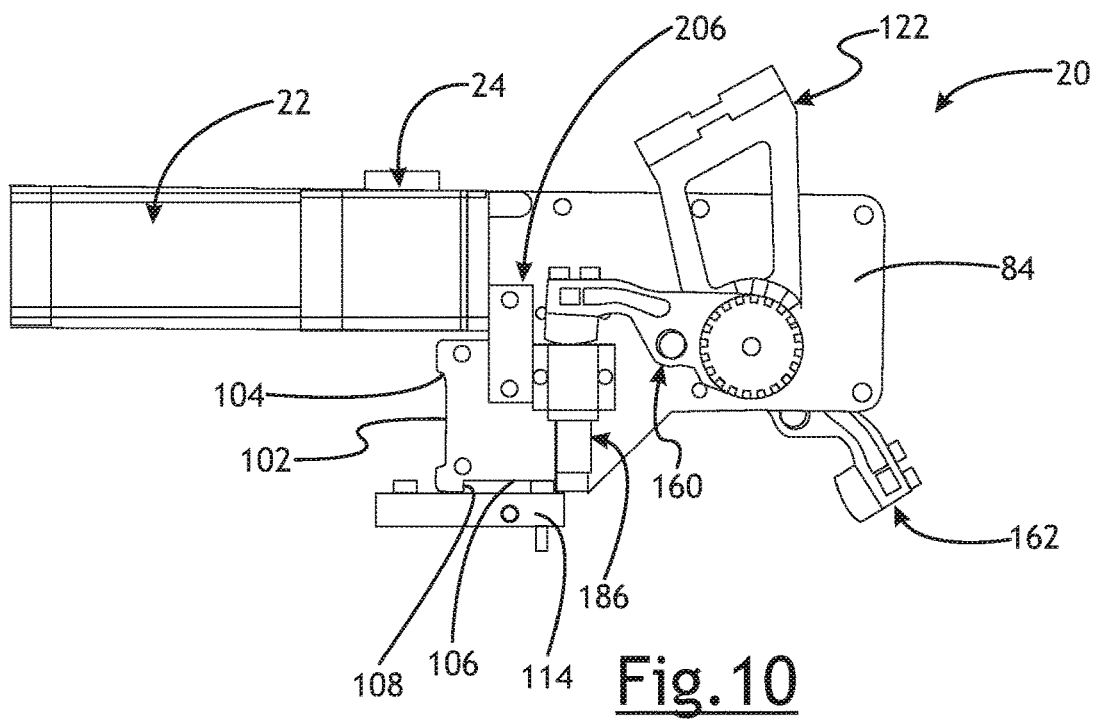
FIG. 10 illustrates a side view of a pivot unit mounted in a horizontal position according to a number of variations.

Referring to FIGS. 1-2 and 9-10, in a number of variations, a pivot unit 20 may comprise a linear actuator 22, a rod assembly 26 (a variation of which is illustrated in FIG. 3), a housing 84, a saddle 122, a first stop arm 160, a second stop arm 162 (a variation of which is illustrated in FIG. 10), a first shock absorber 186, and a second shock absorber (not illustrated). In a number of variations, the pivot unit 20 may further include one or more switches and/or sensors 206 (a variation of which is illustrated in FIGS. 1 and 10) including, but not limited to, one or more proximity sensors/switches, which may be constructed and arranged to measure the position of the first stop arm 160 and/or the second stop arm 162 in relation to the shock absorber 186.

Referring to FIG. 3, in a number of variations, the linear actuator 22 may be operatively attached to and may be constructed and arranged to drive the rod assembly 26. Any number of linear actuators 22 may be used including, but not limited to, an electric linear actuator, a pneumatic cylinder, or a hydraulic cylinder. The rod assembly 26 may comprise a rod 28, an end component 34, a first link 42, and a second link 52. In a number of variations, the rod 28 may comprise a first end 30 and a second end 32. In a number of variations, the first end 30 of the rod 28 may be operatively attached to the linear actuator 22 and may be driven linearly by the linear actuator 22 between a first position and a second position. Referring to FIGS. 1 and 3, in a number of variations, the linear actuator 22 may further include a rod lock assembly 24, which may be constructed and arranged to act as a safety feature by holding the rod 28 in place in the event of a mechanical or power failure of the linear actuator 22.

Referring again to FIG. 3, in a number of variations, the second end 32 of the rod 28 may include an end component 34. In a number of variations, the end component 34 and the rod 28 may be separate components attached to one another or may be one single and continuous component. In a number of variations, the end component 34 may include a central cutout 36, which may define a first arm 38 and a second arm 40 so that the end component 34 comprises a U-shape or a Y-shape. The central cutout 36 may be constructed and arranged to accommodate a first end 44 of the first link 42. In a number of variations, the end component 34 may be rotatably secured to the first link 42 via a pivot pin 50. In a number of variations, a second end 46 of the first link 42 may be rotatably attached to a first end 54 of the second link 52 via a second pivot pin 58. In a number of variations, the first link 42 may comprise an elongated body 48. In a number of variations, the second end 56 of the second link 52 may include an output shaft 60, which may extend through the second link 52. The output shaft 60 may rotate about an axis of rotation 78 (best illustrated in FIG. 4). The output shaft 60 may be secured to the second link 52 so that the second link 52 may drive or rotate the output shaft 60. In a number of variations, the output shaft 60 may be a separate component attached to the second link 52 or may be one single continuous piece with the second link 52. The first end 54 of the second link 52 may be rounded and may include a cutout 66 defining a first arm 68 and a second arm 70 so that the first end 54 has a U-shape or Y-shape when viewed in a direction perpendicular to the axis of rotation of the output shaft 60. The cutout 66 may be constructed and arranged to accommodate the second end 46 of the first link 42. The second end 56 of the second link 52 may include a width greater than a width of the first end 54 when viewed in a direction facing the axis of rotation 78 of the output shaft 60.

Figure 4:
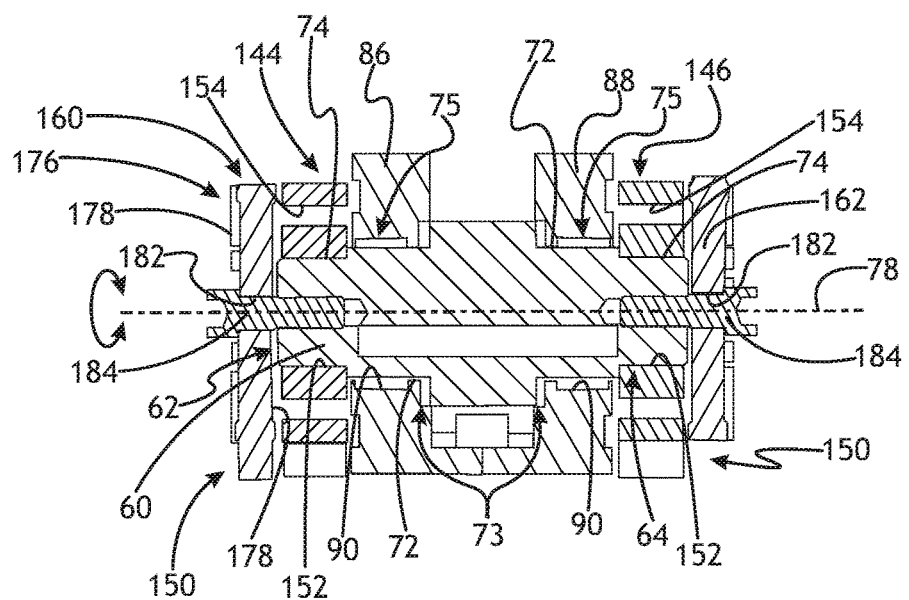
FIG. 4 illustrates a section view of a pivot unit according to a number of variations.

Referring to FIG. 4, in a number of variations, the second link 52 and/or the output shaft 60 may include one or more stepped portions 72, 74, which may assist in assembly and function of the pivot unit 20. In a number of variations, the second link 52 and/or the output shaft 60 may include symmetrical opposing first steps 72, which may be constructed and arranged to mate with a cutout 90 in a first shell 86 and a second shell 88 of the housing 84, as will be discussed hereafter. In a number of variations, the first stepped portion 72 and the cutout 90 in the shell 86, 88 may be circular. In a number of variations, a pair of symmetrical opposing second steps 74 may be adjacent the first steps 72 and may be constructed and arranged to mate with openings 152 in the first and second saddle arms 144, 146, respectively. In a number of variations, the second stepped portion 74 may be square-like or rectangular and the openings 152 in the saddle arms 144, 146 may be corresponding a matching square-like or rectangular shape in order to act as a manufacturing guide in the assembly of the pivot unit 20 and in order to drive the saddle arms 144, 146 when the output shaft 60 is rotated. It is noted that a square-like shape is shown for illustrative purposes only and any number of shapes allowing for rotation of the arms 144, 146 via the output shaft 60 may be used. In a number of variations, the second stepped portion 74 may be stepped down from the first stepped portion 72. Further, the stepped portions 72, 74 may be only on the output shaft 60 or the second link 52, or may be on both the output shaft 60 and the second link 52. In a number of variations, thrust bearings 73 may be positioned between the first stepped portion 72 and the housing 84, which may assist in rotation of the output shaft 60 within the housing 84. In a number of variations, radial bearings 75 may be positioned between the second stepped portion 74 and the housing 84 to assist in rotation of the output shaft 60.

Referring to FIGS. 1-3, in a number of variations, the housing 84 may be constructed and arranged to enclose at least a portion of the rod assembly 26 and the output shaft 60. In a number of variations, the housing 84 may comprise a first shell 86 and a second shell 88. In a number of variations, the first shell 86 and the second shell 88 may be symmetrical opposites and may together form the housing 84. Referring to FIG. 3, in a number of variations, the shells 86, 88 may each include a cavity 92 defined by an inner surface of the shell 86, 88, which may be constructed and arranged to accommodate a portion of the rod assembly 26. In a number of variations, the shells 86, 88 may also each include a seat 98, which may accommodate a first end 118 of a slide/wear plate 116. In a number of variations, the shells 86, 88 may also include a slot 100 spaced opposite of the seat 98, constructed and arranged to accommodate a second end 120 of the slide/wear plate 116. The seat 98 and the slot 100 may be constructed and arranged to support the slide/wear plate 116 in the housing 84. In a number of variations, the slide/wear plate 116 may be positioned adjacent to the rod 28 and the end component 34 to protect the housing 84 from any damage and/or wear from the linear movement of the rod 28 and end component 34 and may also provide a smooth surface to assist in the linear movement of the rod 28 and end component 34. The first and second shells 86, 88 may be attached to each other in any number of variations including, but not limited to, one or more mechanical fasteners 89 (best illustrated in FIG. 1) and/or welding. In a number of variations, the housing shells 86, 88 may also include an opening 90, a variation of which is illustrated in FIG. 4, constructed and arranged to accommodate the first end 62 of the output shaft 60 and the second end 64 of the output shaft 60 to support the output shaft 60. The housing 84 may further include a mounting surface 91 which may be used to attach the housing 84 to the linear actuator 22 in any number of variations including, but not limited to, one or more mechanical fasteners 93, a variation of which is illustrated in FIG. 3, and/or welding.

Referring to FIGS. 3, 9, and 10, in a number of variations, the housing shells 86, 88 may each include a first mounting surface 102 perpendicular to the axis of rotation 78 of the output shaft 60 and a second mounting surface 106 perpendicular to the first mounting surface 102 and the axis of rotation 78 of the output shaft 60. The first mounting surface 102 may include a cutout 104, which may be constructed and arranged to attach to a stand or fixture 114, a variation of which is illustrated in FIG. 9. In a number of variations, the second mounting surface 106 may also include a cutout 108 constructed and arranged to attach to a stand or fixture 114, a variation of which is illustrated in FIG. 10. In a number of variations, the first mounting surfaces 102 may allow for vertical attachment of the pivot unit 20 to the stand or fixture 114, a variation of which is illustrated in FIG. 9. In a number of variations, the second mounting surfaces 106 may allow for horizontal attachment of the pivot unit 20 to the stand or fixture 114, a variation of which is illustrated in FIG. 10. The use of a housing 84 having multiple mounting surfaces 102, 106 allows for application flexibility.

Figure 5:
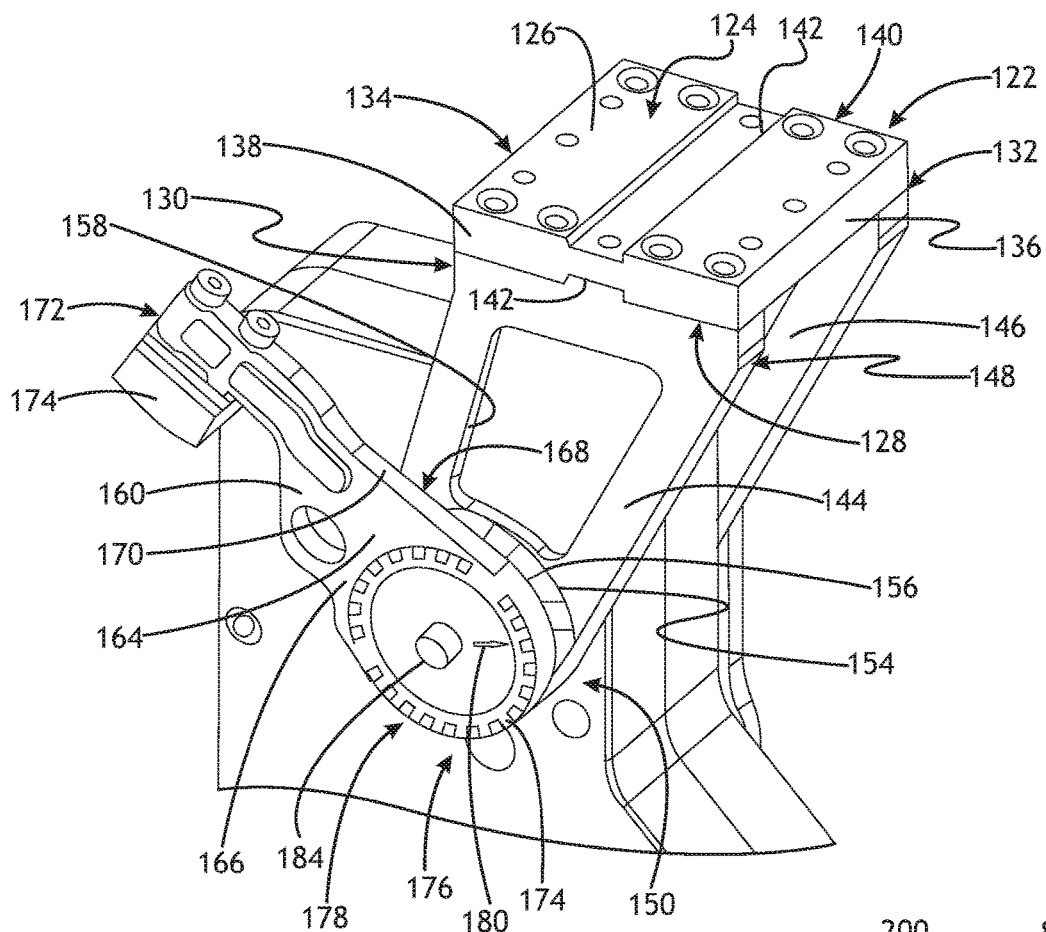
FIG. 5 illustrates a close-up perspective view of a stop arm and saddle according to a number of variations.

Referring to FIG. 5, in a number of variations, the saddle 122 may comprise a base 124, a first arm 144, and a second arm 146. The base 124 may include a first face 126, a second face 128 opposite of the first face 126, a front face 134, a rear face 136 opposite of the front face 134, a first side face 138, and a second side face 140 opposite of the first side face 138. The first face 126 and/or the second face 128 may include a cutout 142 that may extend from the first side face 138 to the second side face 140. The cutout 142 may act as a keyway to assist in attachment of a tool (not illustrated). In a number of variations, the first arm 144 may extend perpendicularly from a first end 130 of the second face 128 adjacent the first side face 138 and the second arm 146 may extend perpendicularly from a second end 132 of the second face 128 adjacent the second side face 140. In a number of variations, the first arm 144 and the second arm 146 may each include a first end 148 and a second end 150. The first end 148 may be constructed and arranged to be attached to the second face 128 and the second end 150 may be constructed and arranged to attach to a stop arm 160, 162, and the output shaft 60, as will be discussed hereafter.

Referring to FIGS. 4 and 5, in a number of variations, the second end 150 of the saddle arms 144, 146 may include a plurality of cutouts or indentations 154 arranged in a circular pattern constructed and arranged to mate with corresponding serrated teeth 178 arranged in a circular pattern on the stop arm 160, 162, as will be discussed hereafter. A plurality of indicators or markings 156 including, but not limited to, degrees, may be marked at various increments adjacent the plurality of cutouts/indentations 154 to assist in positioning the stop arms 160, 162 to achieve a desired range of motion of the stop arms 160, 162, as will be discussed hereafter. The second end 150 of the first and second arms 144, 146 may be rounded. Referring to FIG. 5, in a number of variations, the first and second arms 144, 146 may also include a cutout 158 between the first end 148 and the second end 150, which may reduce the weight and cost of the first and second arms 144, 146. Referring to FIG. 4, in a number of variations, the second end 150 may also include an opening 152 defined by an inner surface of the first and second arms 144, 146, respectively, which may be constructed and arranged to accommodate the output shaft 60. As stated above, the opening 152 may have a corresponding shape to a portion of the output shaft 60 so that the output shaft 60 may drive the first arm 144 and the second arm 146. In a number of variations, the first arm 144 and the second arm 146 may be identical which may allow for ease of assembly and reduced manufacturing costs as the arms 144, 146 may be used interchangeably on either side of the pivot unit 20. In a number of variations, the opening 152 in the second end 150 of the first arm 144 may be secured to a first end 62 of the output shaft 60 and the opening 152 in the second end 150 of the second arm 146 may be secured to a second end 64 of the output shaft 60.

Referring again to FIGS. 4 and 5, in a number of variations, a first stop arm 160 may be attached to the first arm 144 of the saddle 122 and a second stop arm 162 may be attached to the second arm 146 of the saddle 122. In a number of variations, the first and second stop arms 160, 162, may be identical which may allow for ease of assembly and reduced manufacturing costs as the identical stop arms may be used interchangeably on either side of the pivot unit 20. In a number of variations, the stop arms 160, 162 may include an elongated body 164 having a first face 166, a second face 168 opposite of the first face 166, and a third face 170 extending between the first face 166 and the second face 168. In a number of variations, a first end 172 of the stop arms 160, 162 may include a stop 174 constructed and arranged to impact a head 194 of a shock absorber 186, as will be discussed hereafter. A second end 176 of the stop arms 160, 162 may be round and may include a plurality of serrated teeth 178 arranged in a circular pattern on both the first face 166 and the second face 168, constructed and arranged to mate with the plurality of cutouts 154 arranged in a circular pattern on the first or the second arms 144, 146 of the saddle 122. In a number of variations, at least one position indicator or marking 180 including, but not limited to, one or more arrows or a notches, may be marked on the stop arm 160, 162 adjacent to the plurality of teeth 178 and may be used to assist in positioning the stop arms 160, 162 onto the saddle 122, as will be discussed hereafter. The second end 176 may further include an opening 182 defined by an inner surface of the elongated body 164 constructed and arranged to receive a mechanical fastener 184, a variation of which is illustrated in FIG. 4.

In a number of variations, the plurality of teeth 178 on the first face 166 or the second face 168 of the stop arm 160, 162 may be positioned into the plurality of cutouts/indents 154 in the first or second arm 144, 146 of the saddle 122. The range of motion of the saddle 122 may be set by lining up the position indicator or marking 180 on the first face 166 or the second face 168 of the stop arm 160, 162, with the position indicator or marking 156 on the first or second arm 144, 146 of the saddle 122 that corresponds to a desired predetermined range of motion. The saddle 122 may then be set to rotate in the desired range of operation. In a number of variations, the stop arms 160, 162 may then be secured to the output shaft 60 via at least one mechanical fasteners 184. In a number of variations, the first stop arm 160 may be attached to the first arm 144 of the saddle 122 and a first end 62 of the output shaft 60 via a single mechanical fastener 184 and the second stop arm 162 may be attached to the second arm 146 of the saddle 122 and a second end 64 of the output shaft 60 via a single mechanical fastener 184. In a number of variations, the above configuration of the stop arms 160, 162 and the saddle arms 144, 146 may allow for easy adjustment of the stop arms 160, 162 to achieve various ranges of operation of the saddle 122 according to various application specifications.

In a number of variations, actuation of the linear actuator 22 may cause linear movement of the rod 28 which may drive the first link 42, which may cause the second link 52 and therefore the output shaft 60 to rotate. Rotation of the output shaft 60 may cause the arms 144, 146 of the saddle 122 to rotate causing the saddle 122 to rotate about the rotational axis 78 of the output shaft 60. The stop arms 160, 162 may be attached to the saddle arms 144, 146 in any number of positions to achieve a desired rotational range. In a number of variations, the above pivot unit 20 configuration having the saddle 122 attached to portions of the output shaft 60 extending outside of the housing 84 may provide additional area for the saddle 122 to travel allowing for an increased rotational range of motion of the saddle 122 including, but not limited to, an additional 30 degrees of rotation, as opposed to open rod assembly designs.

Further, the use of the above stop arm and saddle arm configurations allows for quick, easy, low cost field adjustment as a worker may easily change the range of motion of the saddle 122 using the indicators 156, 180 on the stop arms 160, 162 and the arms 144, 146 of the saddle 122 and a single mechanical fastener 184 on each side. Even further, the use of the plurality of teeth 178 and the plurality of cutouts/indents 154 allows the radial load on the stop arms 160, 162 to be distributed/shared among all of the teeth 178, which may extend the life of the pivot unit 20 and reduce component fatigue and/or failures of the pivot unit 20.

Referring again to FIG. 1, in a number of variations, a first shock absorber 186 may be attached to the first shell 86 of the housing 84 and may be aligned with the first stop arm 160 and a second shock absorber (not illustrated) may be attached to the second shell 88 of the housing 84 in an opposite direction of the first shock absorber 186 so that the second shock absorber is aligned with the second stop arm 162 (not illustrated).

Figure 6:
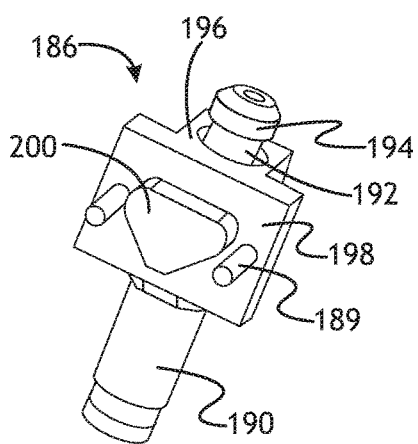
FIG. 6 illustrates a perspective view of a shock absorber according to a number of variations.

Referring to FIG. 6, in a number of variations, the first and second shock absorbers 186 may each include a shaft 190, a spring 192 operatively attached to the shaft 190, a head 194 attached to the spring 192, and a housing 196. In a number of variations, the spring 192 may be in an extended position and may retract when the stop arm 160, 162 contacts and applies a force to the head 194, which may absorb shock from the stop arm 160, 162 and may prevent shock from traveling through the pivot unit 20. In a number of variations, the shock absorber housing 196 may receive at least a portion of the shaft 190 and the spring 192. In a number of variations, the housing 196 may further include a mounting plate 198, which may be constructed and arranged to attach to the first or second shell 86, 88 of the rod assembly housing 84. In a number of variations, the mounting plate 198 may include a triangular protrusion 200. Any number of sized/shaped triangular protrusions may be used depending on application specifications. In a number of variations, the triangular protrusion 200 may extend more than half of the width of the mounting plate 198 and more than half of the height of the mounting plate 198.

Figure 7:
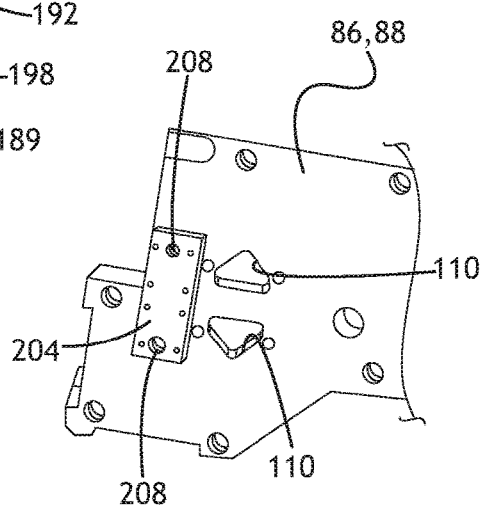
FIG. 7 illustrates a close-up perspective view of a pivot unit housing according to a number of variations.

Referring to FIG. 7, in a number of variations, the first shell 86 and the second shell 88 of the rod assembly housing 84 may include at least one mating triangular cutout 110 constructed and arranged to accommodate the triangular protrusion 200 on the mounting plate 198 of the shock absorber housing 196. In a number of variations, two mirrored triangular cutouts 110 may be positioned opposite of each other so that the shock absorber 186 may be positioned in opposite directions, which may allow for manufacturing flexibility by allowing for the shock absorber 186 to be mounted in various positions on the housing 84. The shock absorber 186 may be attached to the rod assembly housing 84 via one or more mechanical fasteners 189, which may be positioned adjacent the triangular protrusion 200, a variation of which is illustrated in FIG. 6.

Figure 8:
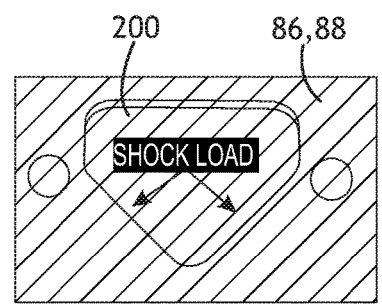
FIG. 8 illustrates a section view of a shock absorber installed into a pivot unit housing according to a number of variations.

Referring to FIG. 8, in a number of variations, the use of the triangular protrusion 200 on the shock absorber 186 mounting plate 198 and the triangular cutout 110 in the rod assembly housing 84 may allow for positional/centering repeatability as well as more efficient load distribution than with the use of a flat shock mount, where the mechanical fasteners are subject to shock loading, at a low manufacturing cost.

Referring to FIGS. 1, 2, and 7, in a number of variations, a switch plate 204 may be attached to one or both sides of the rod assembly housing 84 adjacent the two triangular cutouts 110 in the first shell 86 and/or the second shell 88 of the housing 84 and may be constructed and arranged to accommodate a switch or sensor 206 including, but not limited to, a proximity switch, a variation of which is illustrated in FIGS. 1 and 10. The switch plate 204 may be rectangular and may extend a length past a length of the two triangular cutouts 110 in the first shell 86 and the second shell 88 so that it may accommodate various switch positions on either side of the pivot unit 20, allowing for manufacturing flexibility. The switch plate 204 may be attached to the housing shells 86, 88 in a number of variations including, but not limited to, one or more mechanical fasteners 208 and/or welding.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a pivot unit comprising: a linear actuator; a rod assembly operatively attached to and driven by the linear actuator; an output shaft operatively attached to and driven by the rod assembly; a housing enclosing the rod assembly and a portion of the output shaft, wherein the housing is attached to the linear actuator; a saddle having a base, a first arm extending from the base, and a second arm extending from the base and spaced from the first arm, wherein the first arm and the second arm are operatively attached to opposing ends of the output shaft and driven by the output shaft; a first stop arm operatively attached to the first arm and a first end of the opposing ends of the output shaft; a second stop arm operatively attached to the second arm and a second end of the opposing ends of the output shaft; a first shock absorber secured to a first side of the housing and constructed and arranged to accept a first end of the first stop arm; and a second shock absorber secured to a second side of the housing and constructed and arranged to accept a first end of the second stop arm.

Variation 2 may include a pivot unit as set forth in Variation 1 wherein the housing comprises a first mounting face constructed and arranged to allow for vertical mounting of the pivot unit so that a length of the pivot unit is in a vertical position and a second mounting face constructed and arranged to allow for horizontal mounting of the pivot unit so that the length of the pivot unit is in a horizontal position.

Variation 3 may include a pivot unit as set forth in any of Variations 1-2 wherein the rod assembly comprises: a rod operatively attached to and driven by the linear actuator; a first link having a first end and a second end, wherein the first end of the first link is operatively attached to a first end of the rod; and a second link having a first end and a second end, wherein the first end of the second link is operatively attached to the second end of the first link and a second end of the second link is attached to and drives the output shaft.

Variation 4 may include a pivot unit as set forth in any of Variations 1-3 wherein the rod further includes an end component having a U-shape, and wherein the end component is attached to the first link via a pivot pin.

Variation 5 may include a pivot unit as set forth in any of Variations 1-4 wherein the first stop arm includes a plurality of serrated teeth constructed and arranged to mate with a plurality of cutouts on the first arm of the saddle and the second stop arm include a plurality of teeth constructed and arranged to mate with a plurality of cutouts on the second arm of the saddle.

Variation 6 may include a pivot unit as set forth in any of Variations 1-5 wherein at least one of the first stop arm or the second stop arm further include at least one first marking adjacent the plurality of cutouts and at least one of the first arm or the second arm of the saddle includes at least one second marking adjacent the plurality of cutouts, and wherein the at least one first marking and the at least one second marking are constructed and arranged to be lined up during assembly to indicate a position of at least one of the first stop arm or the second stop arm to control a range of motion of the saddle.

Variation 7 may include a pivot unit as set forth in Variation 5 wherein at least one of the first stop arm or the second stop arm comprises: an elongated body having a first face, a second face, and a third face extending therebetween; a stop secured to the first end of the elongated body; and wherein the plurality of serrated teeth are arranged in a circular pattern on each of the first face and the second face of the elongated body.

Variation 8 may include a pivot unit as set forth in Variation 5 wherein the first stop arm is attached to the first arm of the saddle via a first mechanical fastener and the second stop arm is attached to the second arm of the saddle via a second mechanical fastener.

Variation 9 may include a pivot unit as set forth in any of Variations 1-8 further comprising at least one switch plate, wherein the at least one switch plate is attached to the housing adjacent at least one of the first shock absorber or the second shock absorber and is constructed and arranged to accommodate at least one of a switch or a sensor in a first position or a second position opposite of the first position.

Variation 10 may include a pivot unit as set forth in any of Variations 1-9 wherein the first shock absorber includes a first mounting plate having a first triangular protrusion constructed and arranged to be received in a first triangular cutout in the housing and the second shock absorber includes a second mounting plate having a second triangular protrusion constructed and arranged to be received in a second triangular cutout in the housing.

Variation 11 may include a pivot unit as set forth in Variation 10 wherein the housing further includes a third triangular cutout mirrored from the first triangular cutout and a fourth triangular cutout mirrored from the second triangular cutout to allow for attachment of the first shock absorber or the second shock absorber in opposite directions on the housing.

Variation 12 may include a pivot unit as set forth in any of Variations 1-11 further comprising a wear plate extending within the housing adjacent the rod assembly constructed and arranged to at least one of prevent or reduce wear on the housing from the rod assembly.

Variation 13 may include a pivot unit as set forth in Variation 11 wherein the housing includes a seat constructed and arranged to support a first end of the wear plate, and a slot spaced from the seat constructed and arranged to receive a second end of the wear plate.

Variation 14 may include a pivot unit as set forth in any of Variations 1-13 wherein the linear actuator further includes a rod lock constructed and arranged to prevent the rod assembly from moving in an event a power failure occurs.

Variation 15 may include a pivot unit as set forth in any of Variations 1-14 wherein the housing further comprises a first shell and a second shell.

Variation 16 may include a pivot unit comprising: a linear actuator; a rod operatively attached to and driven by the linear actuator; a first link having a first end and a second end, wherein the first end of the first link is operatively attached to a first end of the rod; a second link having a first end and a second end, wherein the first end of the second link is operatively attached to the second end of the first link; an output shaft operatively attached to the second end of the second link; a housing surrounding at least a portion of the rod, the first link, the second link, and the output shaft; a saddle having a base, a first arm having a plurality of cutouts, and a second arm, having a plurality of cutouts, spaced from the first arm, wherein the first arm and the second arm are operatively attached to the output shaft and are constructed and arranged to be driven by the output shaft; a first stop arm having a plurality of teeth operatively attached to the first plurality of cutouts in the first arm of the saddle and a first end of the output shaft; a second stop arm having a plurality of teeth operatively attached to the second plurality of cutouts in the second arm of the saddle and a second end of the output shaft; a first shock absorber secured to a first side of the housing; and a second shock absorber secured to a second side of the housing.

Variation 17 may include a product comprising: a stop arm comprising an elongated body having a first face, a second face, and a third face extending therebetween; a stop secured to a first end of the elongated body; wherein a second end of the elongated body is rounded and includes a first plurality of serrated teeth on the first face arranged in a circular pattern and a second plurality of serrated teeth on the second face arranged in the circular pattern, wherein at least one of the first plurality of serrated teeth or the second plurality of serrated teeth are constructed and arranged to be secured to a saddle arm of a pivot unit; and wherein the second end further includes an opening defined by an inner surface of the elongated body constructed and arranged to receive a mechanical fastener.

Variation 18 may include a product as set forth in Variation 17 wherein at least one of the first plurality of serrated teeth and the second plurality of serrated teeth are constructed and arranged to share a radial load on the stop arm.

Variation 19 may include a product as set forth in any of Variations 17-18 wherein the opening is located central of the circular pattern.

Variation 20 may include a product as set forth in any of Variations 17-19 further comprising an arm of a saddle, wherein the arm comprises a first face, a second face, and a third face extending between the first face and the second face of the arm, and wherein a first end of the arm is constructed and arranged to be secured to a base of a saddle and a second end of the arm includes a first plurality of cutouts arranged in a circular pattern on the arm and constructed and arranged to accommodate at least one of the first plurality of serrated teeth and the second plurality of serrated teeth on the elongated body.

Variation 21 may include a product as set forth in Variation 20 wherein at least one of the first stop arm or the second stop arm further includes at least one first marking adjacent the first plurality of serrated teeth or the second plurality of serrated teeth and at least one of the first arm or the second arm of the saddle includes at least one second marking adjacent at least one of the first plurality of cutouts or the second plurality of cutouts, and wherein the at least one first marking and the at least one second marking are constructed and arranged to indicate a position of at least one of the first stop arm or the second stop arm to control a range of motion of the saddle.

Variation 22 may include a product comprising: a shock absorber mount comprising: a housing constructed and arranged to receive at least a portion of a shaft and a spring, wherein the housing further comprises a mounting plate, wherein the mounting plate includes a protrusion having a triangular shape constructed and arranged to mate with a triangular shaped cutout on a mating component, and to distribute load on a shock absorber, and wherein the mounting plate further includes at least one opening constructed and arranged to accommodate a mechanical fastener.

Variation 23 may include a product as set forth in Variation 22 further comprising: a shaft, wherein at least a portion of the shaft is received in the housing and is constructed and arranged to move linearly within the housing; a spring operatively attached to the shaft, wherein the spring is in an extended position; and a head operatively attached to the spring.

Variation 24 may include a product comprising: a shock absorber comprising: a shaft; a spring operatively attached to the shaft, wherein the spring is in an extended position; a head operatively attached to the spring; a housing constructed and arranged to receive at least a portion of the shaft and spring, wherein the housing further comprises a mounting plate, wherein the mounting plate includes a protrusion having a triangular shape constructed and arranged to mate with a triangular shaped opening on a mating component for positioning the shock absorber on the mating component and to distribute load on the shock absorber.

Variation 25 may include a method comprising: providing a pivot unit comprising: a linear actuator; a rod assembly driven by the linear actuator; an output shaft driven by the rod assembly; a housing enclosing the rod assembly and a portion of the output shaft; a saddle comprising a first arm, having a first plurality of cutouts, extending from the base and a second arm, having a second plurality of cutouts, extending from the base, wherein the first arm and the second arm are driven by the output shaft to rotate the saddle; a first stop arm having a first plurality of teeth operatively attached to the first arm of the saddle in a first position and attached to the output shaft via a first mechanical fastener; a second stop arm having a second plurality of teeth operatively attached to the second arm in a first position and attached to the output shaft via a second mechanical fastener; a first shock absorber positioned to accept the first stop arm to absorb shock from the first stop arm; and a second shock absorber constructed and arranged to accept the second stop arm to absorb shock from the second stop arm; removing the first mechanical fastener from the output shaft and removing the first stop arm from the first position in the first arm of the saddle; placing the first plurality of teeth in the first stop arm into the first plurality of cutouts in the first arm of the saddle at a second position; securing the first stop arm to the output shaft via the first mechanical fastener; removing the second mechanical fastener from the output shaft and removing the second stop arm from the first position in the second arm of the saddle; placing the second plurality of teeth in the second stop arm into the second plurality of cutouts in the second arm of the saddle at a second position; and securing the second stop arm to the output shaft via the second mechanical fastener.

Variation 26 may include a method as set forth in Variation 25 wherein the first stop arm and the second stop arm each have at least one first marking and the first arm and the second arm of the saddle each include at least one second marking, and wherein the at least one first marking and the at least one second marking are used to position the first stop arm and the second stop arm onto the first arm and the second arm of the saddle to achieve a predetermined range of motion of the saddle.

The above description of select variations within the scope of the invention is merely illustrative in nature and, thus, variations or variants thereof are not to be regarded as a departure from the spirit and scope of the invention.

What is claimed is:

1. A pivot unit comprising:

a linear actuator;

a rod assembly operatively attached to and driven by the linear actuator;

an output shaft operatively attached to and driven by the rod assembly;

a housing enclosing the rod assembly and a portion of the output shaft, wherein the housing is attached to the linear actuator;

a saddle having a base, a first arm extending from the base, and a second arm extending from the base and spaced from the first arm, wherein the first arm and the second arm are operatively attached to opposing ends of the output shaft and driven by the output shaft;

a first stop arm operatively attached to the first arm and a first end of the opposing ends of the output shaft;

a second stop arm operatively attached to the second arm and a second end of the opposing ends of the output shaft;

a first shock absorber secured to a first side of the housing and constructed and arranged to accept a first end of the first stop arm; and a second shock absorber secured to a second side of the housing and constructed and arranged to accept a first end of the second stop arm, wherein the first shock absorber includes a first mounting plate having a first face and at least two sides connected to the first face, and a first triangular protrusion extending from the first face of the first mounting plate constructed and arranged to be received in a first triangular cutout in the housing and the second shock absorber includes a second mounting plate a second face and at least two sides connected to the second face having a second triangular protrusion extending from the second face of the second mounting plate constructed and arranged to be received in a second triangular cutout in the housing, wherein the first triangular cutout and the second triangular cutout each are defined by a base edge of the housing and two side edges of the housing extending from the base edge and converging toward each other, and wherein the first triangular protrusion and the second triangular protrusion each have base edge of the protrusion and two side edges of the protrusion extending from the base edge of the protrusion and converging toward each other.

2. The pivot unit of claim 1 wherein the housing further includes a third triangular cutout mirrored from the first triangular cutout and a fourth triangular cutout mirrored from the second triangular cutout to allow for attachment of the first shock absorber or the second shock absorber in opposite directions on the housing.

3. The pivot unit of claim 2 wherein the housing includes a seat constructed and arranged to support a first end of the wear plate, and a slot spaced from the seat constructed and arranged to receive a second end of the wear plate.

4. The pivot unit of claim 1 wherein first stop arm is attached to the first arm of the saddle and a first end of the output shaft via a single mechanical fastener.

* * * * *